Aug. 4, 1925.

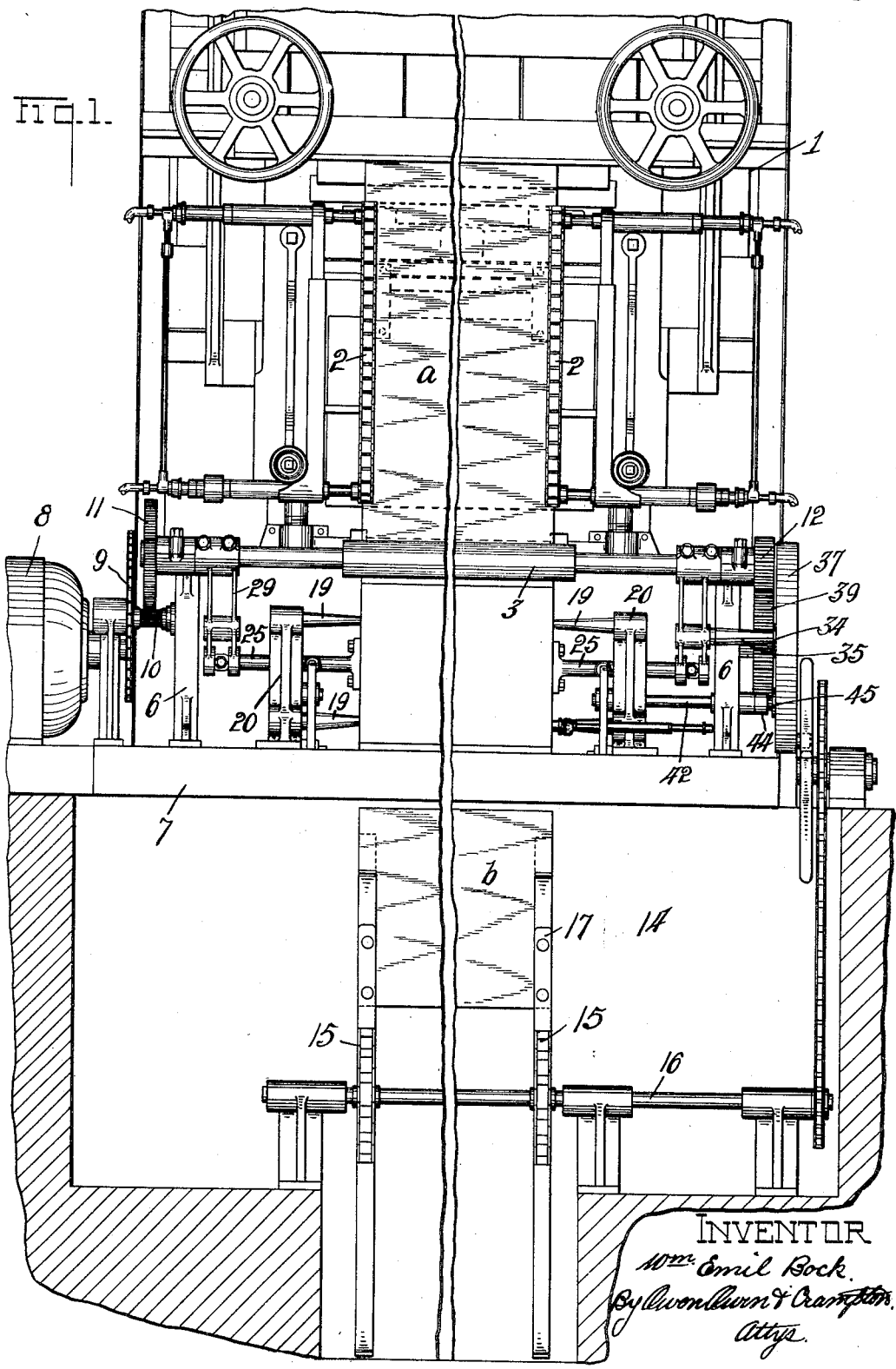

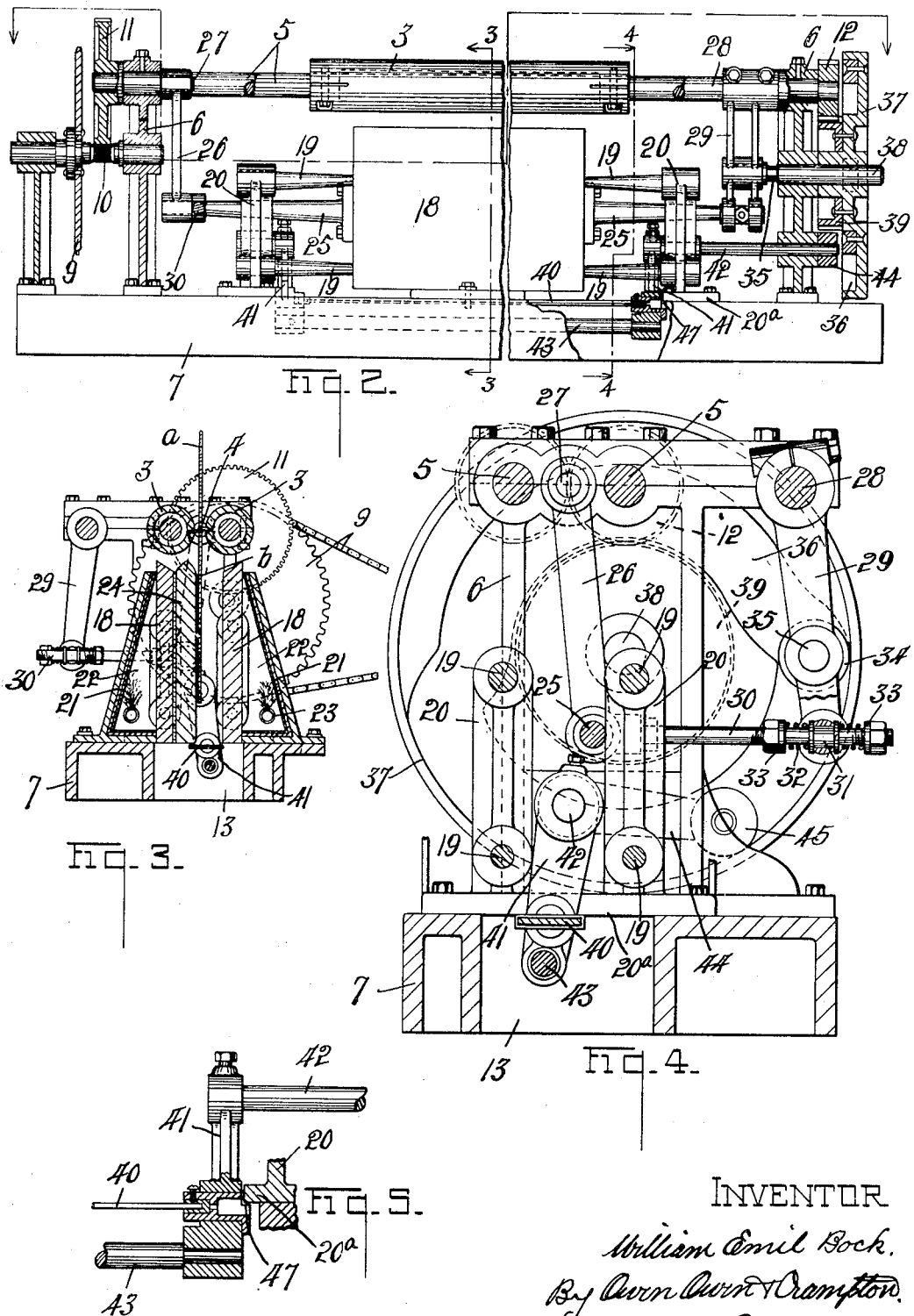

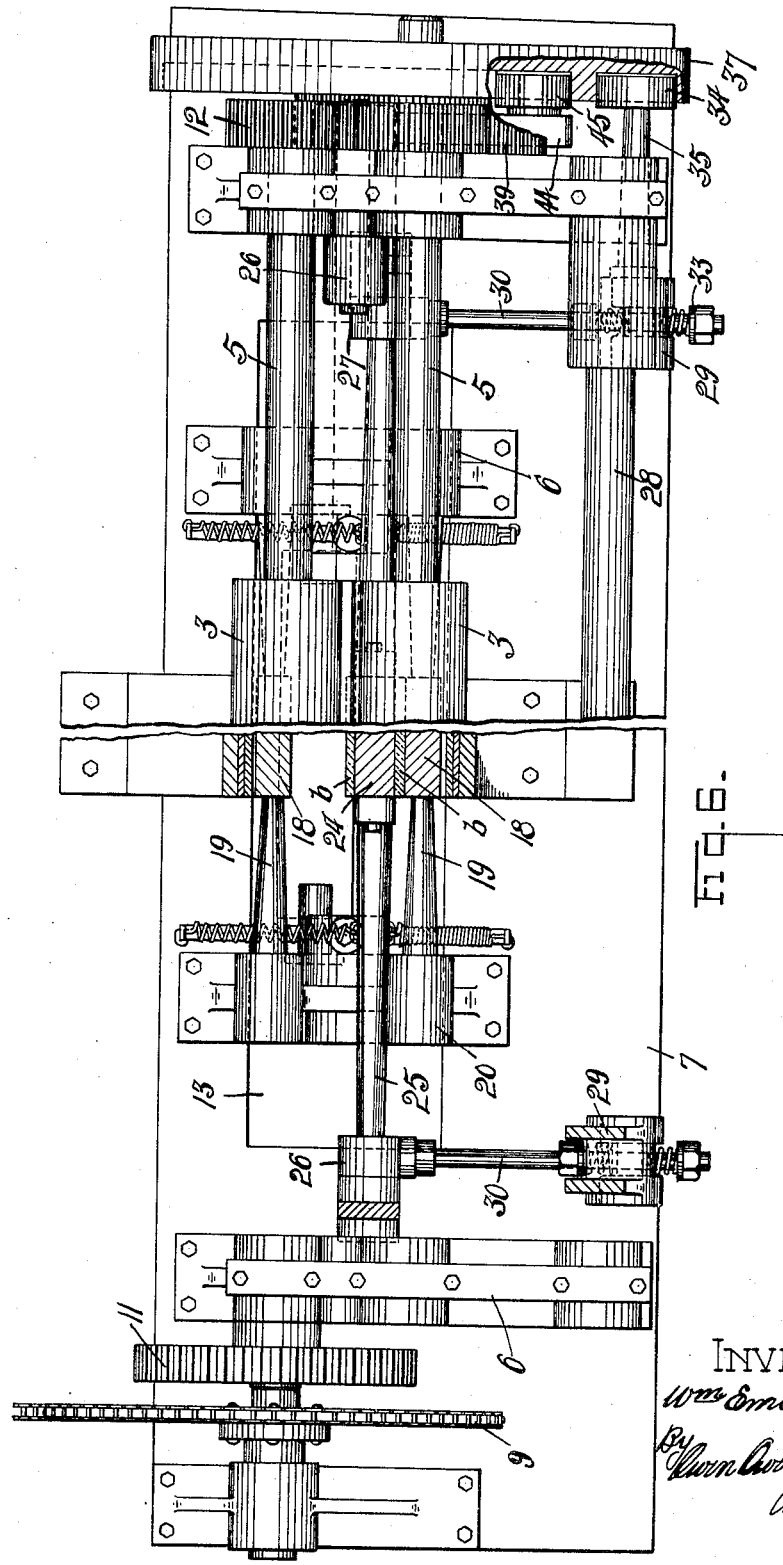

W. E. BOCK 1,548,435

MANUFACTURE OF SHEET GLASS

Filed Nov. 20, 1922      4 Sheets-Sheet 4

INVENTOR
William Emil Bock.
By Owen Owen & Crampton.
Attys.

Patented Aug. 4, 1925.

1,548,435

UNITED STATES PATENT OFFICE.

WILLIAM EMIL BOCK, OF EAGLE POINT COLONY, OHIO, ASSIGNOR TO ERIE GLASS COMPANY, OF TOLEDO, OHIO, A CORPORATION OF DELAWARE.

MANUFACTURE OF SHEET GLASS.

Application filed November 20, 1922. Serial No. 602,000.

*To all whom it may concern:*

Be it known that I, WILLIAM EMIL BOCK, a citizen of the United States, and a resident of Eagle Point Colony, in the county of Wood and State of Ohio, have made an Invention Appertaining to the Manufacture of Sheet Glass; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to the continuous manufacture of sheet glass, and has for its primary object the provision of simple and efficient means, in connection with sheet glass forming apparatus, for severing a sheet as it advances from the forming source, into successive sections and applying a flattening pressure on each section after a severing of the same from the sheet and while still in a hot pliant condition.

The invention is fully described in the following specification, and while, in its broader aspect, it is capable of embodiment in numerous forms, one embodiment thereof is illustrated in the accompanying drawings, in which,—

Figure 7:
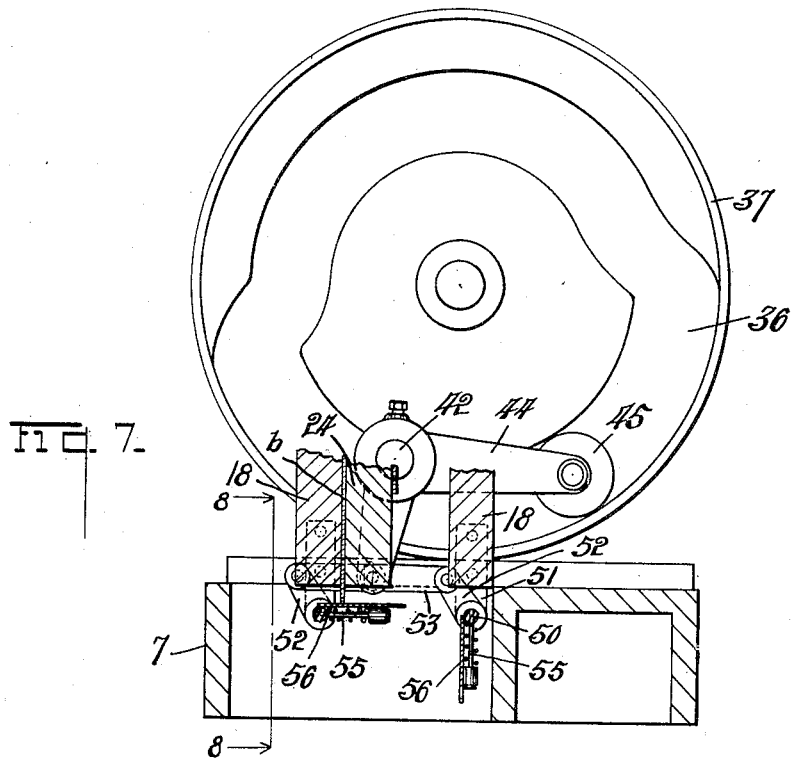
Figure 8:
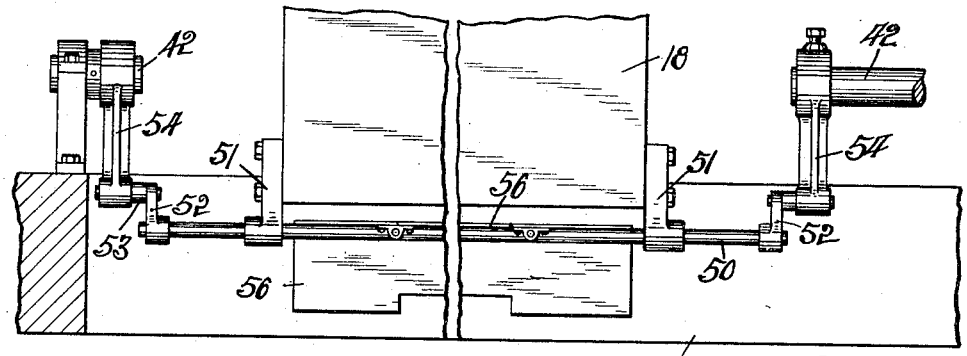

Figure 1 is a fragmentary front elevation of a sheet glass forming apparatus with the means embodying the invention associated therewith, and with the central vertical portion broken away. Fig. 2 is an enlarged detailed front elevation of the means embodying the invention, with different parts broken away. Fig. 3 is a section on the line 3—3 in Fig. 2. Fig. 4 is an enlarged section on the line 4—4 in Fig. 2. Fig. 5 is an enlarged fragmentary section of the swinging sheet support. Fig. 6 is an enlarged top plan view of the apparatus with parts broken away. Fig. 7 is a fragmentary cross-section of a modified form of the sheet supporting means, and Fig. 8 is a fragmentary side elevation thereof.

Referring to the drawings, 1 designates a furnace or means for containing molten glass and having provision for the flowing of such glass therefrom in the form of a continuous sheet *a*, which preferably flows downwardly therefrom by gravity and is engaged at its edges by opposed sets of gripping chains 2. The sets of chains 2 are intended to engage the sheet immediately after leaving the furnace or forming point and to continue in engagement with the edges thereof until the glass has become sufficiently set to maintain its shape. The chains serve both as a means for supporting the sheet to counteract the weight thereof, and to control the speed of flowing of the same from the furnace or forming source, and also serve as width maintaining means for the sheet.

The sheet *a* after leaving the edge gripping chains 2 and while still in a hot or semi-soft or pliant condition passes between a pair of coacting severing members which act to engage the sheet at equidistantly spaced points as it advances from the forming source and to sever the same into successive sections *b*. The severing means, in the present instance, comprises a pair of opposed rolls 3, which may be hollow to permit water cooling and which have elongated blades 4 projecting, one from each roll, in position to have shearing coaction with the sheet at each revolution of the blades, as is apparent. The rolls 3 are mounted on shafts 5 which are journaled in bearing standards 6 rising from a base member 7, and are geared to a common driving source in a manner to cause them to have opposed rotation in unison at the desired speed, which speed corresponds with the desired speed of advance of the sheet. In the present instance, the driving source constitutes a motor 8, which is in chain and sprocket wheel connection 9 with a pinion 10, which is in driving connection with a large gear 11 on one of the roll shafts 5. The roll shafts at their opposite ends are connected by a pair of gears 12 of the same size to cause like rotation to be imparted from one to the other.

The base member 7 is provided with a vertical opening 13 in register with the feed of the sheet *a* and through which the sections *b* of the sheet are intended to pass into a subjacent leer or annealing chamber 14 wherein a suitable conveyor means for the sheet sections is provided. In the present instance, this conveyor means includes a pair of endless sprocket chains 15 mounted on shafts 16, which are in suitable spaced relation longitudinally of the leer, and each chain carries a plurality of sets of spaced sheet-section supporting fingers 17, which are moved by the chains at the proper speed to successively bring them into register with the opening 13 and into position to receive and support the sheet sections *b* as they are severed from the continuous sheet *a* and pass downward through the opening 13. The conveyor chains for this purpose may have a step by step feeding movement imparted thereto by any suitable means. As this conveyor forms no part of the present invention and as numerous types of conveyors may be used for the purpose, the same is not shown in detail herein or specifically described. It will be understood that any conveyor means which will rerecive the sheet sections *b* as they pass downward from the severing means and will convey them at the proper speed through the leer will be suitable for use in connection with the severing and flattening means which constitutes the present invention.

The opening 13 in the base member 7 is of considerably greater width than the thickness of a sheet, and at each side thereof above the base member and in equidistant laterally spaced relation from the path of downward movement of the sheet *a* is disposed a stationary flattening plate 18, each plate being carried at its ends by a respective pair of vertically spaced arms 19 projecting from bearing standards 20 rising from the base member 7. A shell 21 having a heat insulated lining is disposed at the outer side of each plate 18 and cooperates therewith to form a heating chamber 22 in which a burner 23, or other suitable heating means, is disposed for maintaining the plates 18 at the proper temperature to prevent chilling of the glass when brought in contact therewith.

A transversely movable pressure plate 24 of substantially the same size as each of the plates 18 is disposed between the flattening plates 18 and mounted for movement first toward one plate to have sheet pressing coaction therewith and then toward the other plate for like coaction therewith. The space between each stationary plate 18 and the direct path of feeding movement of the sheet is at least equal to or slightly greater than the combined thickness of the plate 24 and a sheet section so that when the plate 24 is pressing one sheet section *b* to a plate 18 the feed of a new sheet section *b* will be down at the opposite side of the plate 24, as shown in Fig. 3. The plate 24 has an arm 25 projecting longitudinally from each end thereof and each arm is engaged and supported at its outer end by the lower end of a swinging arm 26, the upper end of which is mounted on a respective stub shaft 27 projecting from the respective standard 6 between the two shafts 5. It is thus evident that the plate 24 is suspended or carried for transverse swinging movements by the rocker arms 26.

A rock shaft 28 is mounted at its ends in the upper ends of the standards 6 at one side of the shafts 5 and has a pair of rocker arms 29 fixedly projecting downward therefrom for rocking movements therewith. Each arm 29 is yieldingly connected to a rod 30, which pivotally connects at its inner end to the adjacent arm 25 of the plate 24 so that rocking movements of the arms 29 will communicate corresponding rocking movements to the arms 26 and shifting movements to the pressure plate 24. The yielding connection between each arm 29 and its rod 30 is shown in Fig. 4 and constitutes a sleeve 31 which is carried by the arm and slidingly mounted on the rod, and which has its opposite ends thrust against coiled compression springs 32 on the rod, the outer thrusts of which are against nuts or shoulders 33 on the rod.

Predetermined rocking movements are positively communicated to the arms 26 and pressure plate 24 by reason of a roller 34 (Fig. 4) carried by an arm 35 projecting from one of the rocker arms 29, working in a cam-groove 36 provided in the inner face of a cam-wheel 37. This cam-wheel is mounted on a stub shaft 38 projecting outward from one of the standards 6, and a gear 39 (Figs. 1 and 2) is fixed to the inner side of the cam-wheel and is in mesh with one of the gears 12 whereby it is driven in properly timed relation to the driving of the cutting rolls 3. The cam-groove 36 of the wheel is of a shape to cause the pressure plate 24 to be moved over into sheet pressing coaction with one of the stationary plates 18 during approximately one-half of a revolution of the cam wheel and to be moved over into sheet pressing coaction with the other plate 18 during approximately the other half of a rotation of the cam wheel.

When a sheet section *b* has been severed from the sheet *a* and drops between a pair of plates 18 and 24, it is supported and prevented from falling down through the base plate opening 13 by a supporting bar 40, which is disposed immediately below the lower edges of the plates 18 and 24 and is carried by a pair of rocker arms 41, one of which is disposed at each end thereof and hung from a shaft 42 mounted in the standards 6 and 20 at the respective end portion of the base member 7. The arms 41 are rigidly connected at their lower ends by a rod 43. One of the shafts 42 has an arm 44 projecting therefrom at the outer side of its bearing standard 6 and provided with a roll 45, which travels in the cam groove 36 of the wheel 37. It is thus evident that a rotation of the cam wheel will impart a rocking movement to the arms 41 and cause a shifting of the sheet section supporting bar 40 first adjacent to one and then the other of the two stationary pressure plates 18. In order to cause the bar 40 to maintain a horizontal position during a rocking movement of the arms 41 the bar is provided at its ends with journals which have bearings in the respective arms 41 and one of these journals has its outer end projecting beyond the outer side of the associated arm 41 and provided with a diametrically disposed flattened surface 47 projecting under the flat base portion 20ª of the adjacent bearing standard 20 for coaction therewith at the end of each swinging movement of the bar 40 to level the bar surface with respect to a horizontal when the bar is in sheet supporting position.

In Figs. 7 and 8 is shown a modification of the means which supports the sheet sections during the respective pressing operations. In this form a rock shaft 50 is mounted beneath each stationary pressing block 18 in bearings 51 projecting downward from the ends thereof. Each shaft has a rocker arm 52 projecting upward therefrom with the arms at the same ends of the two shafts projecting in parallelism therefrom and connected at their free ends by a link 53. Each link 53 is connected at its center to the lower end of an arm 54 projecting down from a respective rock shaft 42 to one of which the operating arm 44 carrying the cam a roller 45 is secured. Each rock shaft 50 has a pair of pins 55 projecting radially therefrom and carrying a plate 56 for rocking movements with the shaft. The plates 56 of the two rock shafts are disposed at substantially a right angle to each other, and upon a rocking of the shafts in a counter-clockwise direction the left hand plate will be thrown up into sheet supporting position and the right hand plate will be thrown down to inoperative position, as shown in Fig. 7, the reverse action taking place when the rock shafts are rocked in the opposite direction. It is thus evident that the plates upon a rocking of the shafts in first one direction and then the other will be alternately thrown into sheet supporting position at one side or the other of the pressing block 24.

In the operation of an apparatus embodying the invention, the lower end of the continuously feeding sheet a enters the registering open space between a set of pressing blocks 18 and 24 and when it has lowered a predetermined extent therein is severed by the severing rolls 3 to form a separate sheet section b, which is supported at its lower end between the pressing blocks by the bar 40 in one case or by a registering rocker plate 56, shown in Fig. 7. Immediately after the severing action the presser block 24 is moved to close the space into which the sheet previously fed and to press the sheet section against the respective plate 18, the movement of the block 24 being so timed with respect to the feeding movement of the sheet that it has been shifted into pressing relation to the last severed sheet section by the time the end of the feeding sheet has reached the upper end of the pressure bar, so that such sheet will pass down into the open space between it and the pressure plate 18 with which it previously coacted. When the presser plate 24 has been shifted to sheet clamping position, the supporting member 40 or 56 as the case may be, will be shifted into register with the open space so as to support the next sheet section to be severed and to permit the sheet section which is being pressed to pass downwardly from the pressing means when the center pressing plate 24 has been moved to release the same. As each sheet section b passes downward from the pressing means it enters a registering set of guide fingers 17 of the conveyor chains 15 and is carried through the leer 14 by the conveyor means, which means is connected to the drive mechanism for the severing and pressing means and moves in synchronism therewith. It is evident that the pressing means acts on the sheet sections while still in a pliable condition so that the sections will respond to the pressing action of the pressing means and be flattened thereby, thus eliminating any waves or irregularities in the sections which were acquired thereby during the sheet forming action and before the sheet had become sufficiently set to maintain its shape.

I wish it understood that the invention is not restricted to any specific construction, arrangement or form of the parts, as it is capable of numerous modifications and changes without departing from the spirit of the claims.

Having thus described my invention, what I claim as new, and desire to secure by Letters Patent, is,—

1. In combination, a sheet section pressing means, means for feeding the lower end of a glass sheet into the pressing means, means for severing from the sheet a predetermined section disposed in the pressing means, and means before the pressing operation for supporting the severed section in the pressing means and movable from section supporting position to allow the downward passage of the section after the pressing operation.

2. In an apparatus of the class described, a sheet glass pressing means, means for successively supplying sheet glass sections from above to the pressing means, and means beneath the pressing means operable to support a section in the pressing means before the pressing operation, and then release it to permit it to pass downward therefrom after the pressing operation.

3. In an apparatus of the class described, a sheet glass section pressing means open at top and bottom for the introduction of sheet sections in and the discharge of the same therefrom, respectively, and means associated with the outlet opening of the pressing means and operable to periodically open and close the same.

4. In apparatus of the class described, members having pressing surfaces arranged to leave a vertical passageway therebetween, actuating mechanism alternately bringing said surfaces together to press glass therebetween and then separating them, means to feed glass to the press while the surfaces are separated, a stop, and means to move the stop into position beneath said passageway after a pressed section is discharged and before a succeeding section is fed into position.

5. In an apparatus of the class described means for continuously feeding forward a sheet of glass and severing successive sections from its advancing end, means forming a passageway through which the sections pass from the severing means, means periodically operable to stop the movement of successive sections through the passageway at a predetermined point therein, and means operable to cooperate with the walls of said passageway to press the sections into predetermined shape when stopped.

6. In an apparatus of the class described, means for continuously advancing a sheet of glass and severing successive sections from its advancing end, means for momentarily retarding the movement of each section after it is severed, and means moving each section while retarded out of the path of the succeeding section and pressing it into predetermined shape.

7. In an apparatus of the class described wherein sheet glass is formed and successively severed into sections and the sections delivered to a carrying-away point, means for momentarily retarding the movement of each section at a predetermined point in its movement from severing to carrying-away positions, and means for acting on each section while retarded to press it into predetermined shape, said last means having pressing coaction with one section while another section is being fed to said predetermined point.

8. In an apparatus of the class described wherein sheet glass passes from a forming source and is successively severed into sections, means forming a passageway through which the sections pass, means operable to periodically stop the movement of each section at a predetermined point in its passage through the passageway, and means operable in the passageway to press successive sections against opposing walls of the passageway to impart a predetermined shape to each section.

9. In an apparatus of the class described wherein sheet glass passes from a forming source and is successively severed into sections, means forming a passageway through which the sections pass, a pressing member movable transversely in the passageway to permit succeeding sections to pass through the passageway at different sides thereof and alternately operable to press each section against an adjacent wall of the passageway to impart predetermined shape to the section, and means for periodically supporting each section in pressing position in the passageway.

10. In an apparatus of the class described, means forming two passageways and operable to alternately press sheet glass sections in each passageway, means operable to periodically close the bottom of each passageway to periodically stop the passage of a section therethrough, and means for supplying severed sections of glass from a forming source in position to be received first by one passageway and then the other 11. In an apparatus of the class described, means forming two passageways and operable to alternately press sheet glass sections in each passageway, means operable to periodically close the bottom of each passageway to periodically stop the passage of a section therethrough, means for supplying severed sections of glass from a forming source in position to be received first by one passageway and then the other, and means for imparting a predetermined temperature to the outer pressing walls of the passageways.

12. In an apparatus of the class described, means forming a passageway having opposed pressing walls, a pressing member disposed between the walls and transversely movable to have alternate pressing coaction with the walls, means for imparting pressing movements in first one direction and the other to the member, means for supplying sheet glass from a forming source severing the same into sections and successively delivering the sections into the passageway first at one side and then the other of the pressing member, and means operable to momentarily support each section in pressing position in the passageway until gripped by the pressing action of the member and passageway wall.

13. In an apparatus of the class described wherein a sheet of glass passes downward from a forming source and is successively severed into sections, means forming a double passageway having an intermediate wall movable first to one side and then the other of the line of delivery of the severed sections to permit the delivery of successive sections into first one and then the other of the passageways, means operable to periodically move the center member to cooperate with first one and then the other of the outer walls of the passageways to press an interposed section thereto, and means operable to periodically close first one and then the other of the passageways at its lower end to support a section therein.

14. In an apparatus of the class described, two opposed stationary pressing members spaced apart to form a passageway therebetween, a movable pressing plate between the members, means operable to move the pressing plate into pressing coaction with first one and then the other of the members, means for delivering successive sheet glass sections between the stationary members first at one side and then the other side of the center plate, and means periodically operable to support a sheet section first at one side and then the other side of the center plate in pressing position.

15. A glass press having members providing a plurality of stationary pressing surfaces, means continuously feeding a succession of sheet glass sections into said press, means for pressing each successive section against one of said surfaces while the next section is being fed into the press, and means for discharging each section pressed against one of said surfaces while the succeeding section is being pressed against another of said surfaces.

16. In combination, members providing two stationary pressing surfaces, means to feed continuously sections of sheet glass into alignment with said surfaces, means to press the sections against said surfaces, successive sections being pressed against different surfaces, and means to receive the pressed sections continuously, said means being timed to press one section against one surface while a section previously pressed against the other surface is being discharged and another section is being fed into alignment with said other surface.

In testimony whereof I have hereunto signed my name to this specification.

WILLIAM EMIL BOCK.